(12) United States Patent
Wu et al.

(10) Patent No.: US 12,356,414 B2
(45) Date of Patent: Jul. 8, 2025

(54) TIMING ADVANCE (TA) DETERMINATION FOR SIDELINK (SL) COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Hua Wang, Basking Ridge, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 739 days.

(21) Appl. No.: 17/451,543

(22) Filed: Oct. 20, 2021

(65) Prior Publication Data
US 2022/0150943 A1  May 12, 2022

Related U.S. Application Data

(60) Provisional application No. 63/110,581, filed on Nov. 6, 2020.

(51) Int. Cl.
*H04W 72/23* (2023.01)
*H04W 72/20* (2023.01)

(52) U.S. Cl.
CPC ........... *H04W 72/23* (2023.01); *H04W 72/20* (2023.01)

(58) Field of Classification Search
CPC ... H04W 72/121; H04W 72/20; H04W 72/23; H04W 72/232; H04W 72/25;
(Continued)

(56) References Cited

U.S. PATENT DOCUMENTS

2015/0016428 A1 * 1/2015 Narasimha ........ H04W 56/0045
370/336
2017/0265018 A1 * 9/2017 Mok ....................... H04W 4/90
(Continued)

FOREIGN PATENT DOCUMENTS

EP   2983425 A1 * 2/2016 ........ H04W 56/0015
EP   3627915 A1 * 3/2020 ............... H04B 7/14
(Continued)

OTHER PUBLICATIONS

3GPP: "3rd Generation Partnership Project, Technical Specification Group Radio Access Network; Evolved Universal Terrestrial Radio Access (E-UTRA), Physical layer procedures (Release 15)", 3GPP Standard, Technical Specification, 3GPP TS 36.213. 3rd Generation Partnership Project (3GPP), Mobile Competence Centre, 650, Route Des Lucioles, F-06921 Sophia-Antipolis Cedex, France, vol. RAN WG1, No. V15.3.0. Oct. 1, 2018 (Oct. 1, 2018). pp. 1-56, 8-58, 491-506, XP051487502, [retrieved on Oct. 1, 2018] Section 5 .1.1.1.
(Continued)

*Primary Examiner* — Kevin D Mew
(74) *Attorney, Agent, or Firm* — Patterson & Sheridan LLP

(57) ABSTRACT

Aspects of the present disclosure provide apparatus, methods, processing systems, and computer-readable mediums for determining timing advances (TAs) for use in sidelink (SL) communications. A method that may be performed by a receiver (RX) user equipment (UE) includes receiving, from a network entity, an indication of a TA for SL communications with a first transmitter (TX) UE and applying the indicated TA when receiving at least one SL transmission from the first TX UE.

30 Claims, 10 Drawing Sheets

(58) Field of Classification Search
CPC ............... H04W 72/40; H04W 56/001; H04W 56/0015; H04W 56/004; H04W 56/0045; H04W 56/005; H04W 56/0055; H04W 56/006

See application file for complete search history.

(56) References Cited

U.S. PATENT DOCUMENTS

| | | | | |
|---|---|---|---|---|
| 2018/0324723 | A1* | 11/2018 | Akkarakaran | H04W 56/001 |
| 2018/0324882 | A1* | 11/2018 | Gulati | H04B 7/15542 |
| 2019/0306775 | A1* | 10/2019 | Duan | H04L 5/0051 |
| 2019/0363843 | A1* | 11/2019 | Gordaychik | H04L 1/08 |
| 2020/0045596 | A1* | 2/2020 | Liu | H04W 72/23 |
| 2020/0260231 | A1* | 8/2020 | Ganesan | H04B 7/0695 |
| 2020/0267701 | A1* | 8/2020 | Park | H04L 5/0053 |
| 2020/0351844 | A1* | 11/2020 | Rico Alvarino | H04L 5/0094 |
| 2021/0051646 | A1* | 2/2021 | Maaref | H04W 72/02 |
| 2021/0092737 | A1* | 3/2021 | Tang | H04W 4/40 |
| 2021/0136714 | A1* | 5/2021 | Hosseini | H04W 56/001 |
| 2021/0400586 | A1* | 12/2021 | Awoniyi-Oteri | H04W 52/287 |

FOREIGN PATENT DOCUMENTS

| | | | | |
|---|---|---|---|---|
| EP | 3806555 | A1 * | 4/2021 | ........... H04B 17/318 |
| WO | WO-2018202797 | A1 * | 11/2018 | ........ H04W 36/0009 |
| WO | 2020038493 | A1 | 2/2020 | |
| WO | WO-2020031043 | A1 * | 2/2020 | ........... H04W 56/003 |

OTHER PUBLICATIONS

International Search Report and Written Opinion—PCT/US2021/071973—ISA/EPO—Feb. 14, 2022.

Vivo: "Discussion on Mode 1 Resource Allocation Mechanism", 3GPP Draft, 3GPP TSG RAN WGI Meeting #99, R1-1912021, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823163, 18 Pages.

* cited by examiner

TIMING ADVANCE (TA) DETERMINATION FOR SIDELINK (SL) COMMUNICATION

CROSS-REFERENCE TO RELATED APPLICATION(S)

This application claims priority to U.S. Provisional Application No. 63/110,581 filed Nov. 6, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to timing adjustments for processing sidelink (SL) communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink (SL) communications generally refer to communications between devices (e.g., between UEs). As the demand for mobile broadband access continues to increase, the demand for improvements to SL communications continues to increase as well.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved device-to-device communications in a wireless network.

Certain aspects of the present disclosure provide a method for wireless communication by a receiver (RX) user equipment (UE). The method generally includes receiving, from a network entity, an indication of a timing advance (TA) for sidelink (SL) communications with a first transmitter (TX) UE and applying the indicated TA when receiving at least one SL transmission from the first TX UE.

Certain aspects of the present disclosure provide a method for wireless communication by a network entity. The method generally includes determining a first TA for a RX UE to be used for SL communications between the RX UE and at least a first TX UE and transmitting, to the RX UE, an indication of the first TA.

Certain aspects of the present disclosure can be implemented in an apparatus for wireless communication by an RX UE. The apparatus generally includes a memory and at least one processor coupled with the memory. The at least one processor coupled with the memory is generally configured to receive, from a network entity, an indication of a TA for SL communications with a first TX UE and apply the indicated TA when receiving at least one SL transmission from the first TX UE.

Certain aspects of the present disclosure can be implemented in an apparatus for wireless communication by a network entity. The apparatus generally includes a memory and at least one processor coupled with the memory. The at least one processor coupled with the memory is generally configured to determine a first TA for a RX UE to be used for SL communications between the RX UE and at least a first TX UE and transmit, to the RX UE, an indication of the first TA.

Certain aspects of the present disclosure can be implemented in an apparatus for wireless communication by an RX UE. The apparatus generally includes means for receiving, from a network entity, an indication of a TA for SL communications with a first TX UE and means for applying the indicated TA when receiving at least one SL transmission from the first TX UE.

Certain aspects of the present disclosure can be implemented in an apparatus for wireless communication by a network entity. The apparatus generally includes means for determining a first TA for an RX UE to be used for SL communications between the RX UE and at least a first TX UE and means for transmitting, to the RX UE, an indication of the first TA.

Certain aspects of the present disclosure can be implemented in a computer-readable medium having computer executable code stored thereon. The computer-readable medium having computer executable code stored thereon generally includes code for obtaining, from a network entity, an indication of a T) for S) communications with a first T) UE and code for applying the indicated TA when receiving at least one SL transmission from the first TX UE.

Certain aspects of the present disclosure can be implemented in a computer-readable medium having computer executable code stored thereon. The computer-readable medium having computer executable code stored thereon generally includes code for determining a first T) for an RX UE to be used for SL communications between the RX UE and at least a first TX UE, and code for outputting, for transmission to the RX UE, an indication of the first TA.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
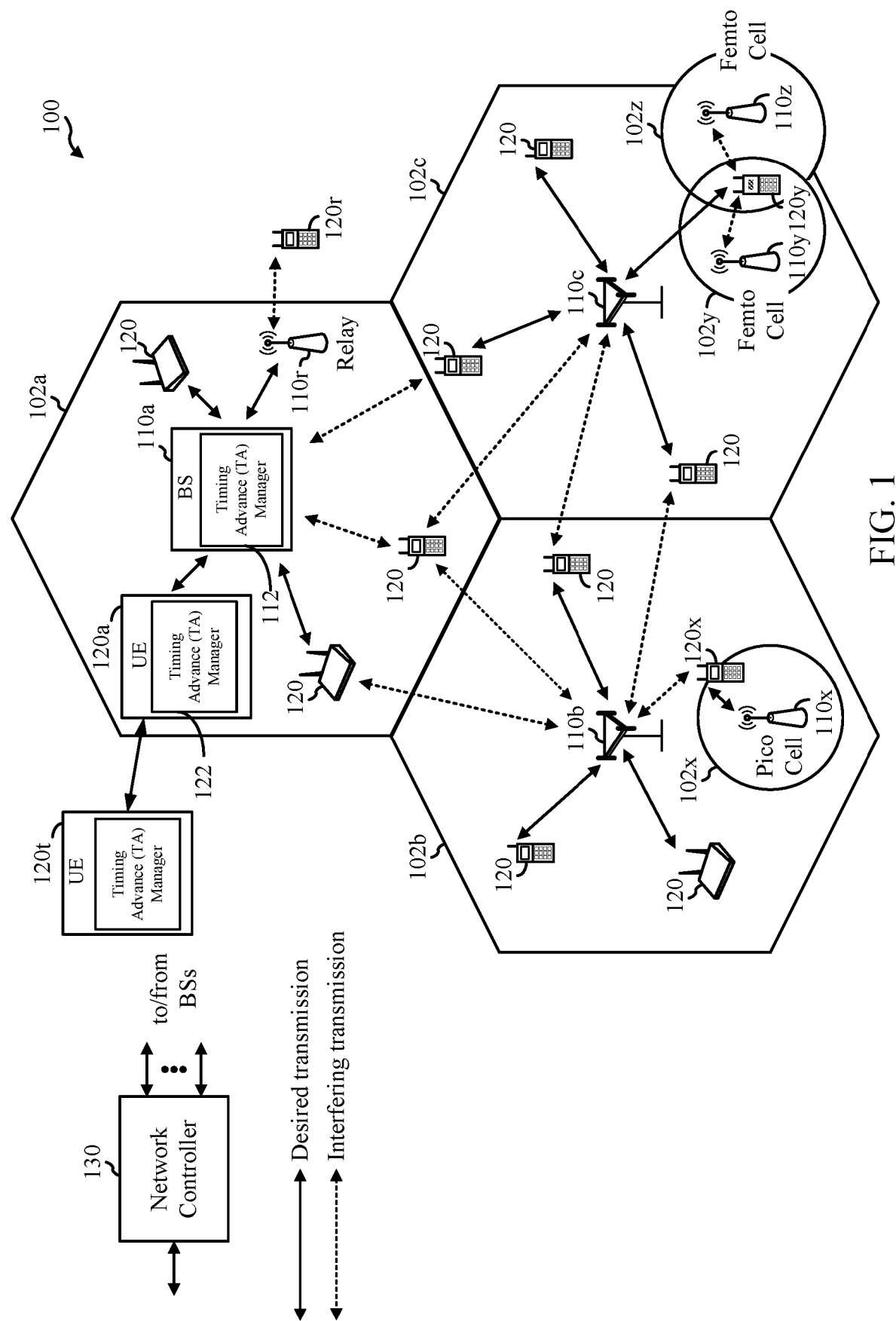
FIG. 1 is a block diagram conceptually illustrating an example wireless communication network, in accordance with certain aspects of the present disclosure.

Communication between devices, e.g., two user equipments (UEs) may be referred to as the sidelink (SL). In some cases, timing advances (TAs) may be applied in SL transmissions between the devices. Applying DL timing and/or UL timing in SL transmissions, however, may lead to further issues. For example, in cases where downlink (DL) timing is applied for SL transmissions, UL transmission interference may occur. Alternatively, in cases where uplink (UL) timing is applied for SL transmissions, a SL receiver (RX) UE may not be aware of the timing used for an SL transmission (e.g., when the timing is based on a SL transmitter (TX) UE's UL timing); thus, the SL RX UE may not be able to correctly decode the SL transmission Accordingly, aspects of the present disclosure provide apparatus, methods, processing systems, and computer-readable mediums for determining TAs for use in SL communications. For example, in some cases, a network entity may transmit an indication of a TA to be used in SL communications between at least an SL RX UE and an SL TX UE.

The following description provides examples of TA determinations for SL communication, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access (e.g., 5G NR) may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability specifications. These services may also have different transmission time intervals (TTIs) to meet respective quality of service (QoS) specifications. In addition, these services may co-exist in the same time-domain resources (for example, a slot or subframe) or frequency-domain resource (for example, a component carrier (CC)). NR supports beamforming and beam direction may be dynamically configured.

Multiple-input multiple-output (MIMO) transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communication Network

FIG. 1 illustrates an example wireless communication network 100 in which aspects of the present disclosure may be performed. For example, one or more user equipments (UEs) 120 of wireless communication network 100 may be configured to perform (or have a timing advance (TA) manager 122 configured to perform or cause UE 120 to perform) operations 600 described below with reference to FIG. 6. Similarly, one or more base stations (BSs) 110 of wireless communication network 100 may be configured to perform (or have a TA manager 112 configured to perform or cause BS 110 to perform) operations 700 described below with reference to FIG. 7.

TA manager 122 of UE 120a may be configured for receiving, from a network entity, an indication of a TA for sidelink (SL) communications with a first transmitter (TX) UE and applying the indicated TA when receiving at least one SL transmission from the first TX UE, in accordance with certain aspects described herein. The TAs may be indicated to UE 120a by BS 110a. TA manager 112 of BS 110a may be configured for determining a first TA for a receiver (RX) UE to be used for SL communications between the RX UE and at least a first TX UE and transmitting, to the RX UE, an indication of the first TA, in accordance with certain aspects described herein.

Wireless communication network 100 may be, for example, a 5G new radio (NR) network. As shown in FIG. 1, wireless communication network 100 may be in communication with a core network 132. Core network 132 may be in communication with one or more BSs 110 and/or UEs 120 in wireless communication network 100 via one or more interfaces.

Further, as illustrated in FIG. 1, wireless communication network 100 may include a number of BSs 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b, and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS 110 may support one or multiple cells.

A network controller 130 may couple to a set of BSs 110 and provide coordination and control for these BSs 110. Network controller 130 may communicate with the BSs 110 via a backhaul. BSs 110 may also communicate with one another (e.g., directly or indirectly) via wireless or wireline backhaul.

BSs 110 communicate with UEs 120a-y (each also individually referred to herein as UE 120 or collectively as UEs 120) in wireless communication network 100. UEs 120 (e.g., 120x, 120y, etc.) may be dispersed throughout wireless communication network 100, and each UE 120 may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs 120 may be considered machine-type communication (MTC) devices or evolved MTC (eMTC) devices. MTC and eMTC UEs include, for example, robots, drones, remote devices, sensors, meters, monitors, location tags, etc., that may communicate with a BS 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Wireless communication network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120, to facilitate communication between devices.

In some examples, access to the air interface may be scheduled. A scheduling entity (e.g., BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In FIG. 1, a solid line with double arrows indicates desired transmissions between a UE 120 and a serving BS 110, which is a BS 110 designated to serve UE 120 on the downlink (DL) and/or uplink (UL). A finely dashed line with double arrows indicates interfering transmissions between a UE 120 and a BS 110.

Figure 2:
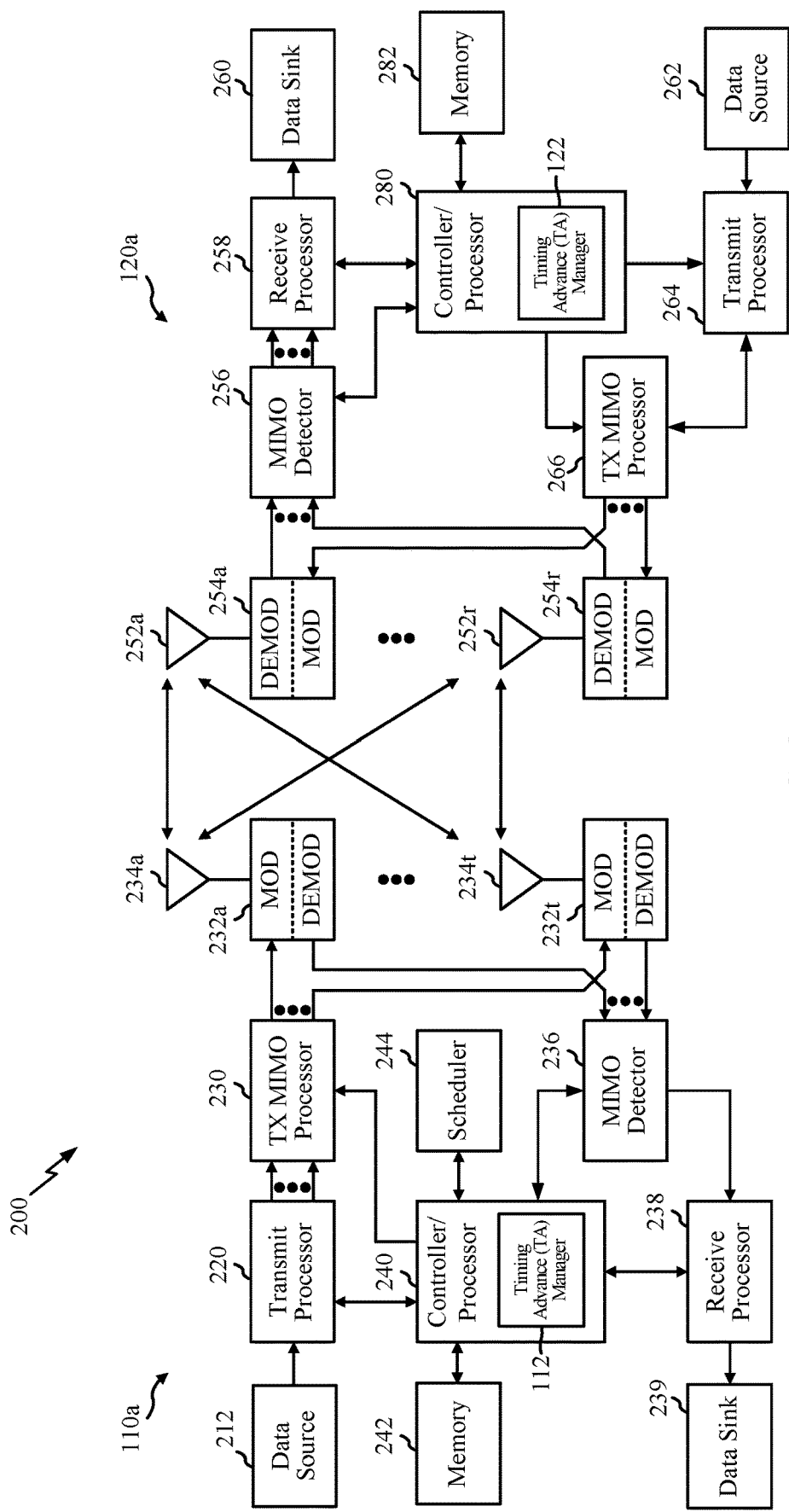
FIG. 2 is a block diagram illustrating an example base station (BS) and an example user equipment (UE), in accordance with certain aspects of the present disclosure.

FIG. 2 is a block diagram illustrating example components of BS 110a and UE 120a (e.g., in wireless communication network 100 of FIG. 1), which may be used to implement aspects of the present disclosure. For example, antennas 252, processors 266, 258, 264, and/or controller/processor 280 (including TA manager 122) of UE 120a may be used to perform the various techniques and methods described herein with reference to FIG. 6. Similarly, antennas 234, processors 220, 230, 238, and/or controller/processor 240 (including TA manager 112) of BS 110a may be used to perform the various techniques and methods described herein with reference to FIG. 7.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (CE) (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and channel state information reference signal (CSI-RS). A TX multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a DL signal. DL signals from modulators 232a through 232t may be transmitted via the antennas 234a through 234t, respectively.

At UE 120a, antennas 252a through 252r may receive the DL signals from BS 110a and may provide received signals to the demodulators (DEMODs) in transceivers 254a through 254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a through 254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the UL, at UE 120a, a transmit processor 264 may receive and process data (e.g., for the PUSCH) from a data source 262 and control information (e.g., for the physical uplink control channel (PUCCH) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the modulators in transceivers 254a through 254r (e.g., for single-carrier frequency division multiplexing (SC-FDM), etc.), and transmitted to BS 110a. At BS 110a, the UL signals from UE 120a may be received by antennas 234, processed by modulators 232, detected by MIMO detector 236 if applicable, and further processed by receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs 120 for data transmission on the DL and/or UL.

NR may utilize OFDM with a cyclic prefix (CP) on the UL and/or DL and/or SC-FDM on the UL. NR may support half-duplex operation using time division duplexing (TDD). OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. NR may support a base subcarrier spacing (SCS) of 15 kilohertz (KHz) and other SCS may be defined with respect to the base SCS (e.g., 30 kHz, 60 kHz, 120 kHz, 240 kHz, etc.). The system bandwidth may also be partitioned into subbands. For example, a subband may cover multiple RBs.

Figure 3:
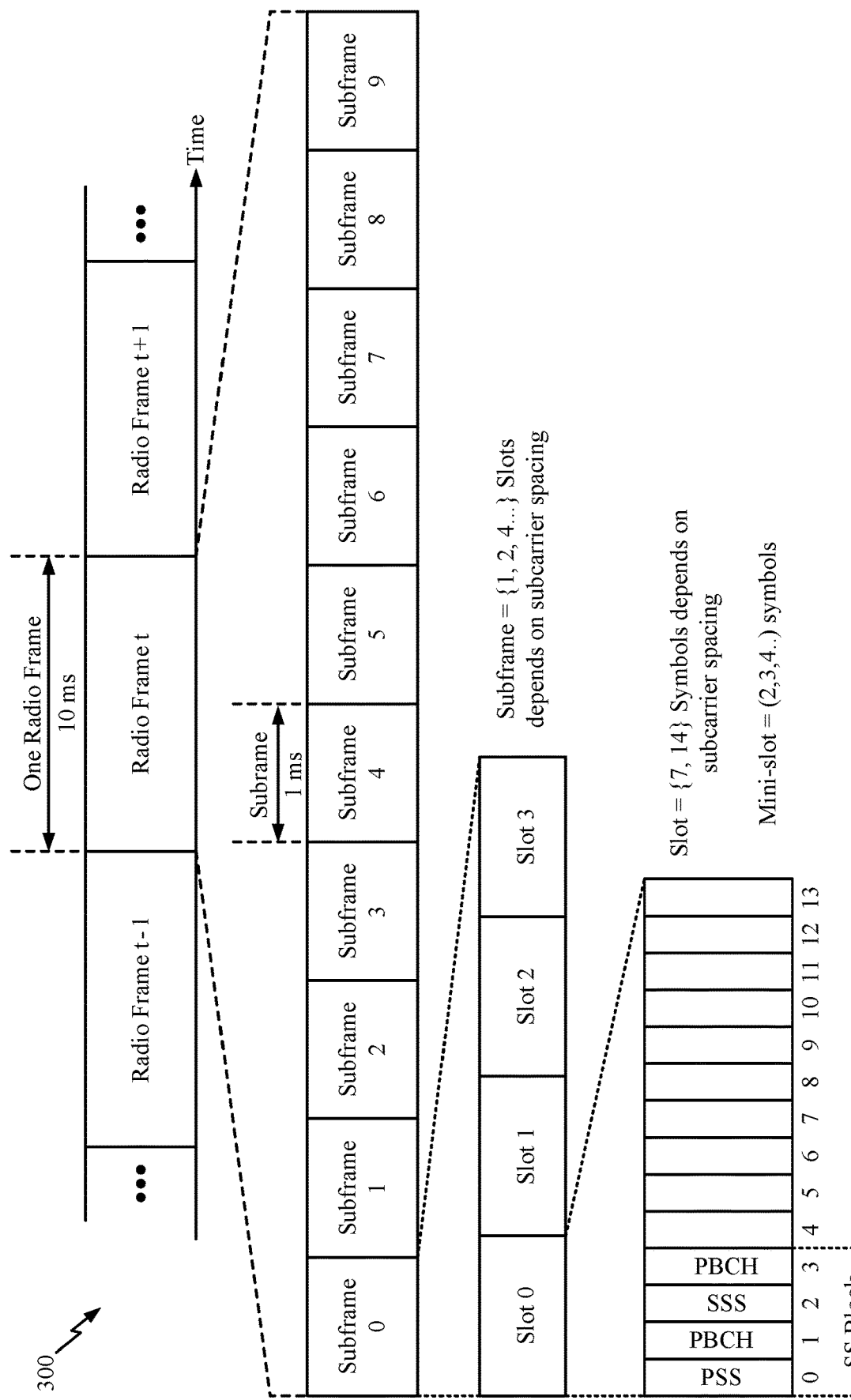
FIG. 3 illustrates an example of a frame format for a new radio (NR) system, in accordance with certain aspects of the present disclosure

In NR, a subframe is 1 millisecond (ms), but the basic transmit time interval (TTI) is referred to as a slot. FIG. 3 is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a TTI having a duration less than a slot (e.g., 2, 3, or 4 symbols). Each symbol in a slot may indicate a link direction (e.g., DL, UL, or flexible) for data transmission, and the link direction for each subframe may be dynamically switched. The link directions may be based on the slot format. Each slot may include DL/UL data as well as DL/UL control information.

While communication between UEs (e.g., UE 120*a* of FIGS. 1 and 2) and BSs (e.g., BSs 110*a* of FIGS. 1 and 2) may be referred to as the access link, and the access link may be provided via a Uu interface, communication between devices may be referred to as the sidelink (SL).

In some circumstances, two or more subordinate entities (e.g., UEs) may communicate with each other using SL signals. Real-world applications of such SL communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications. Generally, a SL signal may refer to a signal communicated from one subordinate entity (e.g., UE1) to another subordinate entity (e.g., UE2) without relaying that communication through a scheduling entity (e.g., UE or BS), even though the scheduling entity may be utilized for scheduling and/or control purposes. In some examples, the SL signals may be communicated using a licensed spectrum (unlike wireless local area networks (WLANs), which typically use an unlicensed spectrum).

Various SL channels may be used for SL communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as SL resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR SL supports, for a UE, a case where all the symbols in a slot are available for SL, as well as another case where only a subset of consecutive symbols in a slot are available for SL.

Figure 4A:
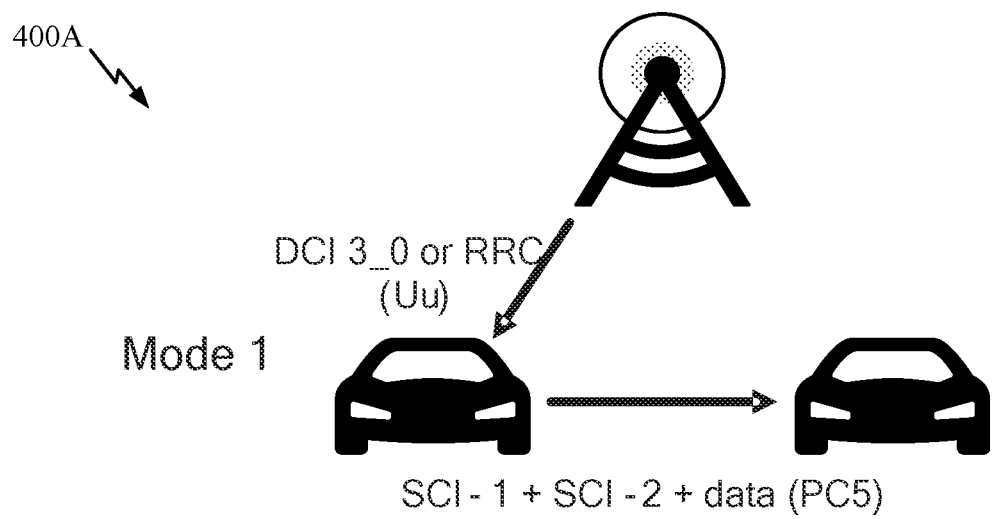
FIGS. 4A and 4B illustrate two modes of sidelink (SL) communication, in accordance with certain aspects of the present disclosure.
Figure 4B:
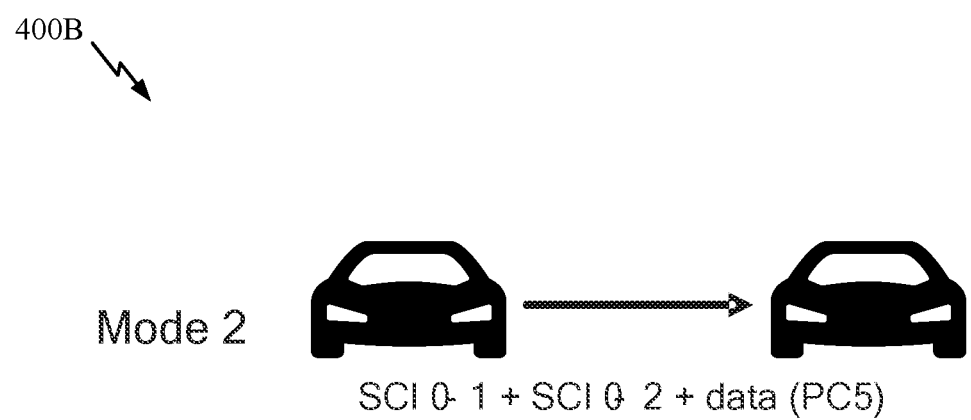

In NR, there are generally two basic SL resource allocation modes. FIGS. 4A and 4B illustrate two modes of SL communication, in accordance with certain aspects of the present disclosure.

According to a first mode (Mode 1), as shown in FIG. 4A, a BS may allocate SL resources for SL communications between UEs. For example, a BS may transmit downlink control information (DCI) (e.g., DCI 3_0) to allocate time and frequency resources and indicate transmission timing. A modulation and coding scheme (MCS) may be determined by a UE within the limit set by the BS.

According to a second mode (Mode 2), as shown in FIG. 4B, UEs may determine the SL resources (the BS does not schedule SL transmission resources within SL resources configured by the BS/network). In this case, UEs may autonomously select SL resources for transmission (following some rules in NR standard). A UE may assist in SL resource selection for other UEs. A UE may be configured with an NR configured grant for SL transmission, and the UE may schedule SL transmissions for other UEs.

Signaling on the SL is the same for both resource allocation modes. Thus, from an RX UE point of view, there is no difference between the two modes. Further, a resource pool may be shared by Mode 1 and Mode 2 resource allocations.

In certain systems, TAs may be used to control UL signal timing in cellular UL transmissions. Based on a TA, a UE may delay (e.g., send late) an UL transmission or advance the UL transmission (e.g., send early) by some amount.

For example, during a random access channel (RACH) procedure, a network entity (e.g., a BS) may determine a TA to be applied in UL transmissions by measuring propagation delay from a RACH signal. In LTE, when a UE wishes to establish a radio resource control (RRC) connection with the network entity, the UE may transmit a Random Access Preamble. Following receipt of the preamble, the network entity may estimate the transmission timing of the terminal and transmit a Random Access Response which may consist of a TA command. Based on the TA command, the UE may adjust the terminal transmit timing.

Figure 5:
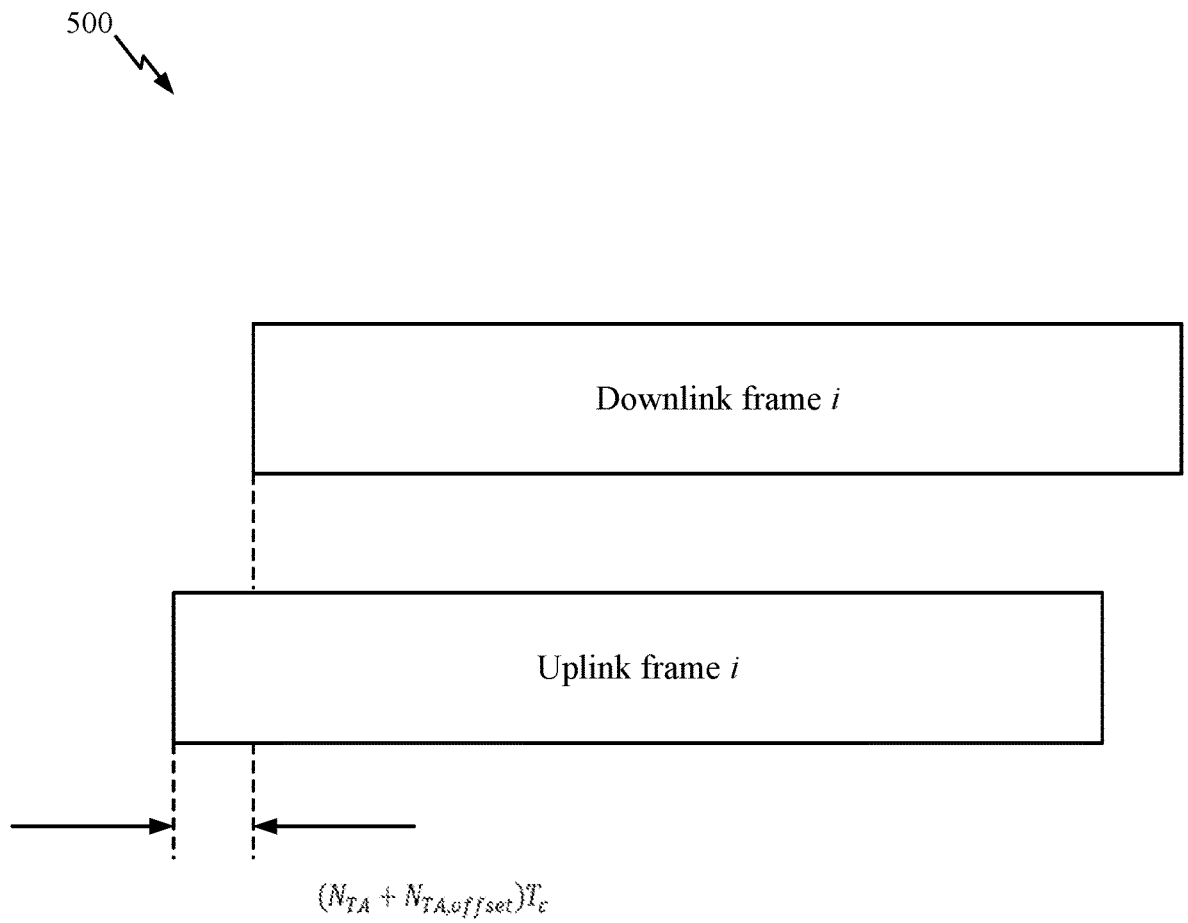
FIG. 5 illustrates an example relationship between Long Term Evolution (LTE) downlink (DL) timing and uplink (UL) timing during a random access channel (RACH) procedure, in accordance with certain aspects of the present disclosure.

FIG. 5 illustrates an example relationship between LTE DL timing and UL timing during a RACH procedure, in accordance with certain aspects of the present disclosure. As shown in FIG. 5, a network entity (e.g., a BS) may transmit a DL frame i at time $t_0$ which may be received by a UE at time $t_0+t_{pd}$, where $t_{pd}$ is the propagation delay from the network entity to the UE. Subsequently, the UE may transmit a RACH signal (e.g., UL frame i as shown in FIG. 5) with timing reference $t_0+t_{pd}$ which may be received by the network entity at time $t_0+2t_{pd}$. The network entity may determine the TA based on the propagation delay.

Generally, the TA determined by the network entity is approximately $2t_{pd}$ with respect to the UE's DL receive time. When the UE applies this TA for UL transmission (i.e., UE advances the UL transmission by $2t_{pd}$ with respect to its DL timing), the UE ensures that the UL signal arriving time at the network entity aligns with the network entity DL transmitter (TX) timing.

Because TAs depend on the propagation delay from the network entity, various UEs may apply different TAs to their UL transmissions. This helps to ensure that UL signal arrival timings from different UEs are aligned with the network entity's DL TX timing.

Example Timing Advance (TA) Determinations for Sidelink (SL) Communication

Aspects of the present disclosure provide apparatus, methods, processing systems, and computer-readable mediums for determining timing advances (TAs) for use in sidelink (SL) communications. For example, in some cases, a network entity may transmit an indication of a TA to be used in SL communications between at least a receiver (RX) UE and a transmitter (TX) UE.

In SL communication (e.g., vehicle-to-everything (V2X) or device-to-device (D2D)), two or more UEs may share the uplink (UL) spectrum. For example, a pool of resources in the UL spectrum (e.g., resource elements in UL slots) may be configured for SL communication between two or more UEs.

As mentioned above (in reference to FIGS. 4A and 4B), there are generally two basic SL resource allocation modes (e.g., Mode 1 and Mode 2). In Mode 1, where SL communication sharing the UL spectrum is scheduled by a base station (BS), the BS may allocate resource(s) to a SL TX UE (e.g., via downlink control information (DCI)). The SL TX UE may transmit, in the allocated resources, sidelink control information (SCI) and data to an SL RX UE. The SL RX UE may detect the SCI and decode the data. Alternatively, in Mode 2, where UEs autonomously select SL resources, a BS may indicate the resource pool configuration allowing for a SL TX UE to select resource(s). Accordingly, the SL TX UE may select resource(s) from the pool and transmit, in the selected resources, SCI and data to an SL RX UE. The SL RX UE may detect the SCI and decode the data.

In some cases, TAs may be applied in SL transmissions. For example, in LTE Release 12 and 13, SL Mode 1, timing of an SCI transmission may be based on DL timing while timing of a data channel transmission may be based on DL timing plus an UL TA (wherein the UL TA is based on UL timing). The TA may be indicated in SCI and either the SL TX UE or SL RX UE may apply the UL TA for transmitting and receiving, respectively. In LTE Release 12 and 13, SL Mode 2, as another example, a TA may not be applied. In LTE Release 14 and 15, as another example, all transmission modes may be based on DL timing and a TA may not be applied. Additionally, in NR Release 16, all SL transmission modes are based on DL timing and no TA is applied.

Applying DL timing and/or UL timing in SL transmissions, however, may lead to further issues. In cases where DL timing is applied for SL transmissions, UL transmission interference may occur. For example, when SL transmissions and UL transmissions are multiplexed in the same slot (e.g., frequency division multiplexed (FDM)), the misaligned RX timing of two transmissions at a network entity (e.g., BS) may cause interference to the UL transmissions. Alternatively, in cases where UL timing is applied in SL transmission, RX UEs may not be able to correctly decode SL transmissions. For example, when UL timing is applied in the SL transmission, an SL RX UE (and in some cases, such as in autonomous Mode 2, a SL TX UE) may not be aware of the timing used for an SL transmission (e.g., when the timing is based on the SL TX UE's UL timing). Where the timing used for SL transmission is not DL timing and is unknown to the SL RX UE, the SL RX UE may not be able to correctly decode the SL transmission.

Accordingly, techniques for determining TAs for use in SL communications is desired.

In aspects of the present disclosure, an RX UE receiving SL transmissions, may receive from a network entity, an indication of a TA for SL communications with a first TX UE. The RX UE may apply the indicated TA when receiving one or more transmissions from a TX UE. The indicated TA may be a positive or negative value (e.g., in terms of a basic time unit).

Figure 6:
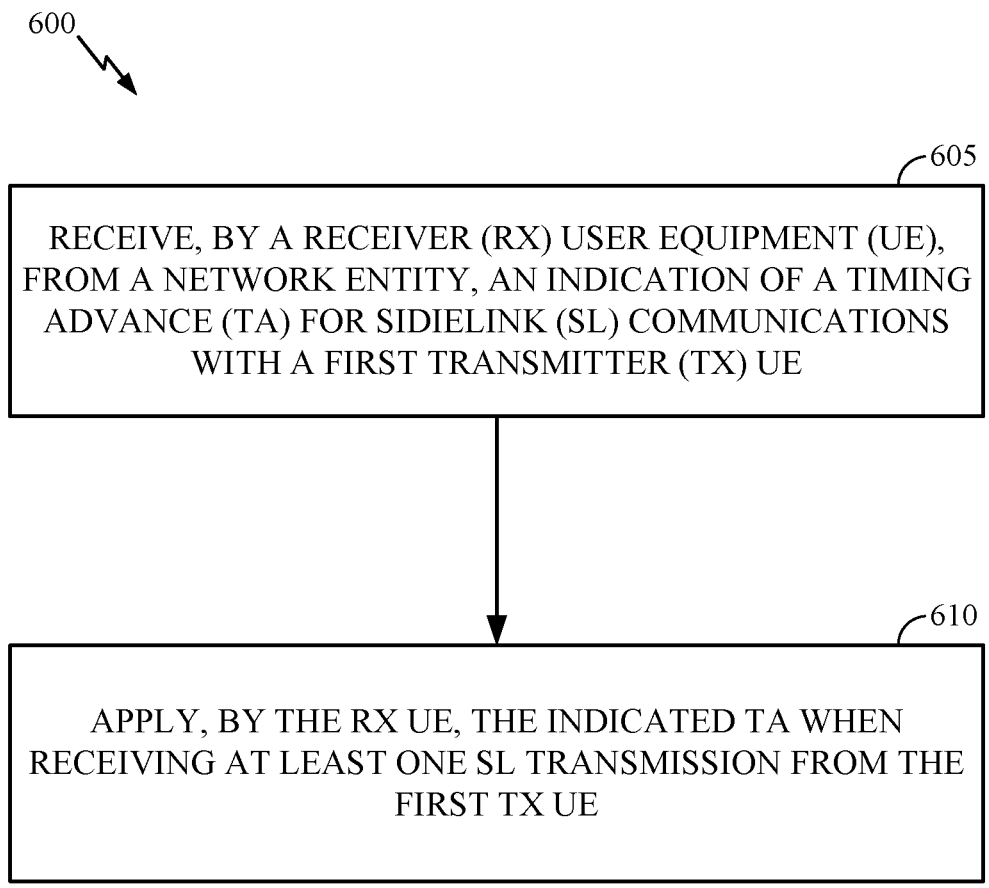
FIG. 6 is a flow diagram illustrating example operations for wireless communication by a UE, in accordance with certain aspects of the present disclosure.

FIG. 6 is a flow diagram illustrating example operations 600 for wireless communication by a UE, in accordance with certain aspects of the present disclosure. For example, operations 600 may be performed by an RX UE, such as UE 120a or UE 120t illustrated FIG. 1 and FIG. 2 when performing SL communications with another UE.

Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 600 begin, at 605, by the RX UE, receiving, from a network entity, an indication of a TA for SL communications with a first TX UE.

Various options may use by a network entity to determine and indicate the TA to be used for SL communications by the RX UE.

In some aspects, the TA indication may be carried in a downlink control information (DCI) intended for the RX UE. In some cases, the TA may be based on the TA of the TX UE in SL communication with the RX UE.

In some aspects, the TA indicated by the network entity may be specific for SL communications between the RX UE and a specific TX UE (herein referred to as a first TX UE). Accordingly, the network entity may semi-statically configure the RX UE with a TA for use receiving SL transmissions from the specific TX UE. The TA indicated by the network entity may take into account a propagation delay between the RX UE and this specific TX UE.

In some aspects, the indicated TA may be common to a plurality of UEs in a serving cell, including the RX UE and a TX UE in SL communication with the RX UE. In some cases, the network entity may indicate the common TA to the plurality of UEs via broadcast signaling. The plurality of UEs may use this common TA for SL communications.

With reference back to FIG. 6, at 610, the RX UE applies the indicated TA when receiving at least one SL transmission from the first TX UE.

Figure 7:
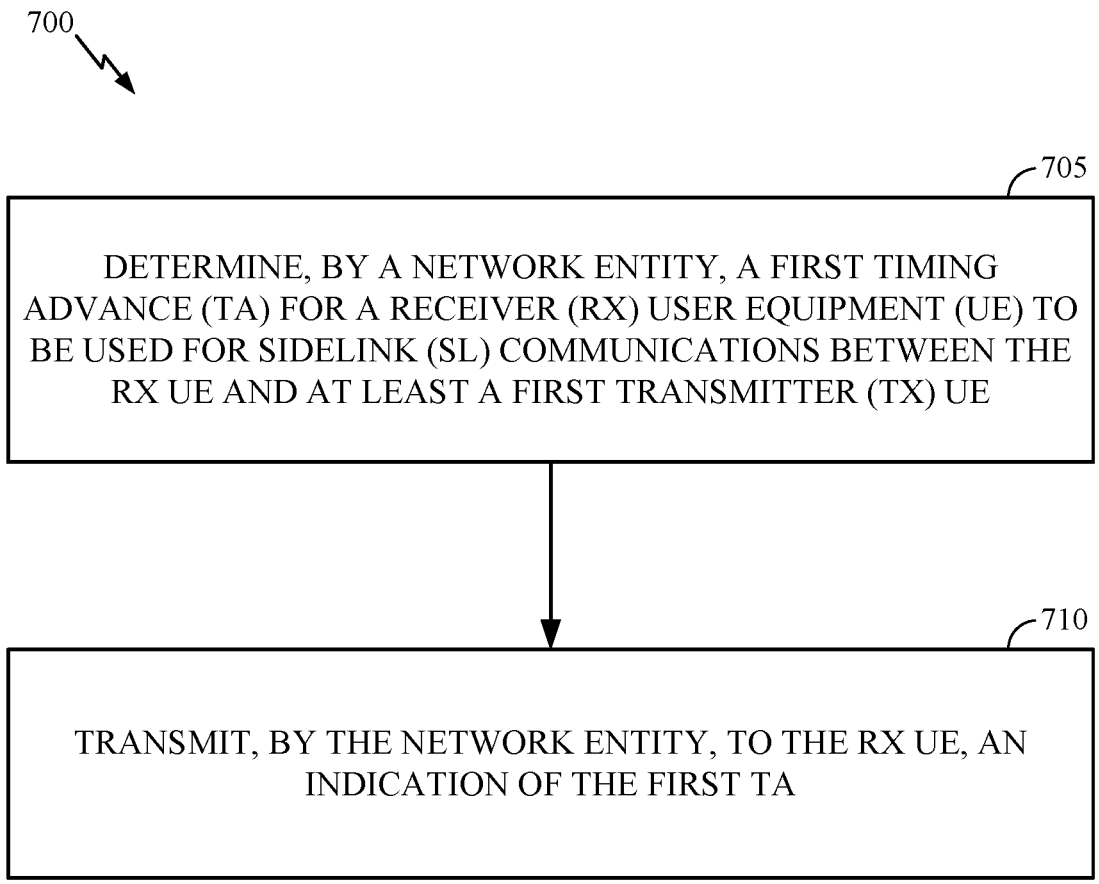
FIG. 7 is a flow diagram illustrating example operations for wireless communication by a network entity, in accordance with certain aspects of the present disclosure.

FIG. 7 illustrates example operations 700 for wireless communication by a network entity, in accordance with certain aspects of the present disclosure. Operations 700 may be performed, for example, by BS 110a in wireless communication network 100. Operations 700 may be considered complementary to operations 600 of FIG. 6. For example, operations 700 may be performed by a network entity to indicate a TA to an RX UE performing operations 600 of FIG. 6.

Operations 700 may be implemented as software components that are executed and run on one or more processors (e.g., controller/processor 240 of FIG. 2). Further, the transmission and reception of signals by the network entity in operations 700 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 700 begin, at 705, by the network entity determining a first TA for a RX UE to be used for SL communications between the RX UE and at least a first TX UE. At 710, the network entity transmits, to the RX UE, an indication of the first TA.

Figure 8:
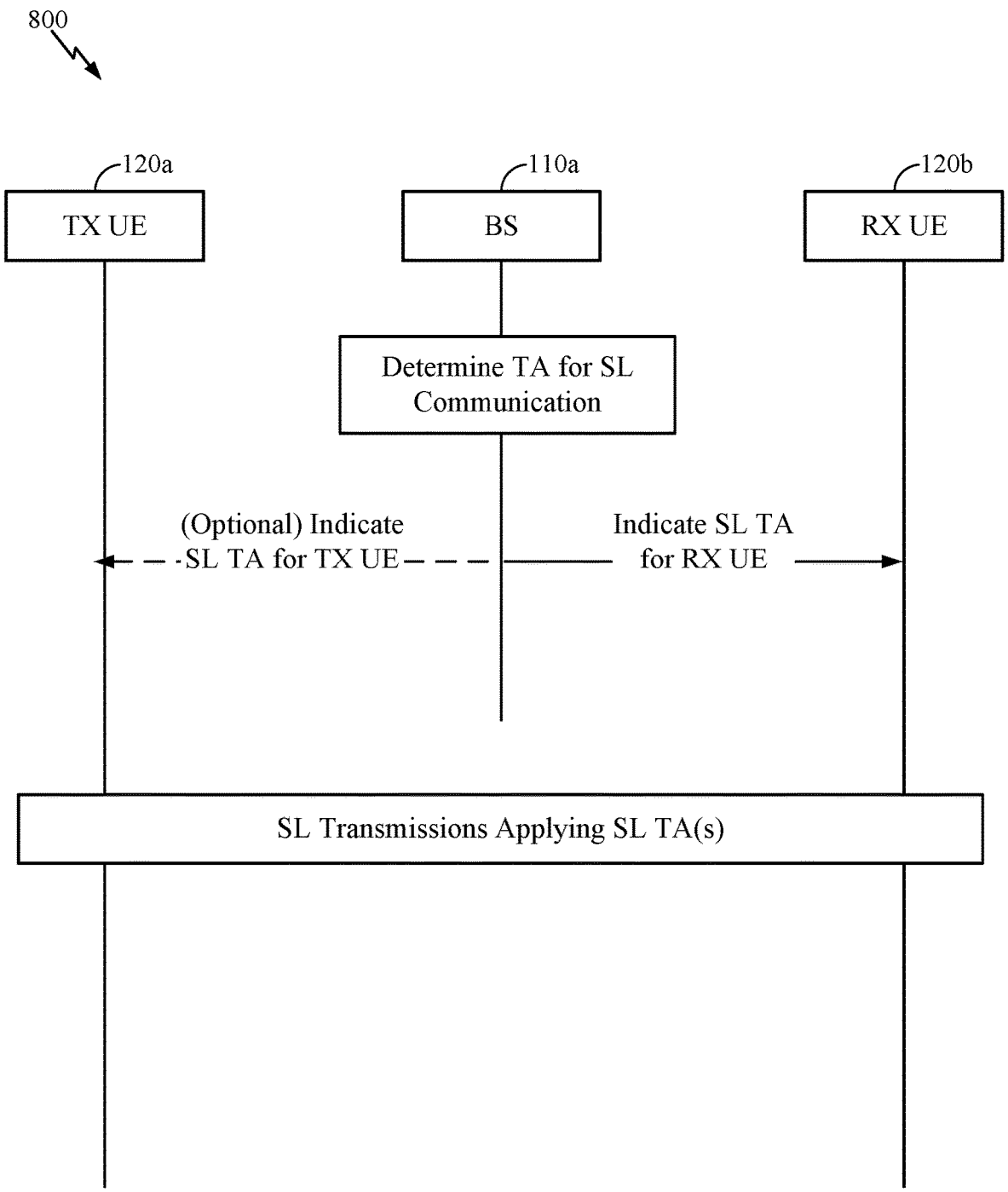
FIG. 8 is a call flow diagram illustrating example signaling for determining and indicating timing advances (TAs) in SL communications, in accordance with certain aspects of the present disclosure.

Operations 600 and 700 of FIGS. 6 and 7 may be understood with reference to FIG. 8. FIG. 8 is a call flow diagram 800 illustrating example signaling for determining and indicating TAs for SL communications, in accordance with aspects of the present disclosure.

As illustrated in FIG. 8, a network entity (e.g., a BS such as BS 110a illustrated in FIG. 1 and FIG. 2) may determine one or more TAs for SL communication and signal an indication of a TA to RX UE 120b. In some examples, BS 110a may also signal an indication of a TA to TX UE 120a. The TA indicated to RX UE 120b may be different than the TA indicated to TX UE 120a. TX UE 120a and RX UE 120b may apply the TA(s) for SL transmissions.

In some aspects, the TA indication may be carried in a DCI intended for the RX UE. In this scenario, the network entity transmitting the TA indication in a DCI may be associated with both the RX UE and TX UE in SL communication with the RX UE.

In some examples, the network entity may transmit a common DCI to schedule SL transmission (i.e., the common DCI may be intended for both the first TX UE and the RX UE). The DCI may schedule at least one SL transmission from the TX UE. Accordingly, the TX UE may apply the TA for transmitting on SL to the RX UE, while the RX UE may apply the TA for receiving on SL from the TX UE.

In some examples, the network entity may transmit a UE-specific DCI to inform the RX UE of the TA. In certain cases, the DCI may be a specific DCI sent only for the purpose of providing the indication of the TA.

In some cases, the DCI may be transmitted when a TA applied for the SL transmission needs to change. In such cases, an RX UE may continue to apply a previously indicated TA until a change is indicated. In some examples, the TA may be indicated as a change relative to a current TA value (as opposed to a new TA value). Before the RX UE may receive SL transmissions from the TX UE, the RX UE may need to first receive the DCI with the indicated TA.

In some aspects, the network entity may determine the TA based on either an UL TA of the TX UE, an UL TA of the RX UE, or a mean value of both. In some examples, the UL TA of the TX UE may be a quantized UL TA of the TX UE or an UL TA of the TX UE with an offset. In some examples, the UL TA of the RX UE may be a quantized UL TA of the RX UE or an UL TA of the RX UE with an offset.

In some aspects, the indicated TA may be specific for SL communications between the RX UE and a specific TX UE (herein referred to as a first TX UE). Accordingly, the network entity may semi-statically configure the RX UE with the TA for use in receiving SL transmissions from the specific TX UE. The indicated TA may take into account a propagation delay between the RX UE and the specific TX UE.

In some aspects, where the RX UE receives transmissions from multiple TX UEs, the network entity may configure the RX UE with different TAs to apply for SL communications with the different TX UEs. In other words, due to different relative locations/distances of the different TX UEs compared to the RX UE, the TA used for receiving from one UE may be different than a TA used for receiving from another UE. The TA configurations may be provided via radio resource control (RRC) signaling (e.g., the network entity may transmit dedicated RRC signaling to the RX UE to indicate a second TA).

In some aspects, the network entity may determine a first TA for an RX UE to use in receiving SL transmissions. Additionally, the network entity may determine a second TA for a TX UE to use in transmitting SL transmissions. The second TA may be based on or be the UL TA of the TX UE. In some examples, the first TA may be different from the second TA.

In some aspects, the first TA may be determined based, at least in part, on a location of the TX UE and/or a location of the RX UE. Accordingly, the network entity may receive, from the TX UE, a first report of the location of the TX UE and/or receive, from the RX UE, a second report of the location of the RX UE. The reports may give either an absolute location or zone location of each of the TX UE and RX UE.

Based on the location of the RX UE, the location of the TX UE, and/or the TX UE TA ($t_{TA}$), the network entity may determine a TA which the RX UE may use for SL receiving (e.g., $t_{TA}+t_{TA,\Delta}$ wherein $t_{TA}+t_{TA,\Delta}$ is determined based on the RX UE location). The location of the RX UE and/or the location of the TX UE may be either an absolute location or a zone location, which may be reported to network entity by the RX/TX UE.

In some aspects, the indicated TA may be common to a plurality of UEs in a serving cell, the servicing cell including an RX UE and a TX UE in SL communication with the RX UE. The TA value may be transmitted in a broadcast manner (e.g., in a system information block (SIB) to the plurality of UEs in the serving cell).

In some aspects, the TA value may be determined by the network entity based, at least in part, on a cell radius of the serving cell. For example, where a cell has a larger radius (e.g., large network entity coverage), the TA indicated by the network entity may be a larger value.

In some examples, mapping between cell radius and TA values may be pre-defined. For example, a first value for the TA may be selected and configured when the cell radius is less than a threshold radius, while a second value for the TA may be selected and configured when the cell radius is equal to or greater than the threshold radius. As an illustrative example, where the cell has an average radius that is smaller than $r_0$ (e.g., the threshold radius), the TA configured for SL transmission may be equal to zero (e.g., TA=0 meaning no TA is applied). On the other hand, where the cell has an average radius that is larger than $r_0$ (e.g., the threshold radius), the TA configured for SL transmission may be a pre-determined value, for example $t_{TA,SL}$ (e.g., TA=$t_{TA,SL}$ which is a pre-determined value). In some examples, more quantization levels may be specified for the mapping between cell radius and TA values. In some other examples, the TA configuration may be based on a BS/network entity implementation; for example, a BS may configure a TA from a set of candidate TA values.

In some cases, various options for signaling/applying a TA to a sidelink transmission and/or reception may be combined. In some cases, a TX UE may apply a TA that is determined by a network entity (e.g., BS) and/or a TX UE. For example, the TX UE may apply its UL TA for SL transmission. In some cases, an RX UE may apply a common TA that is indicated by a BS. For example, like in the case described above where a BS indicates a common TA that SL UEs are to be using for SL communications, the BS may broadcast a TA value that will be used by RX UEs receiving on sidelink.

Example Wireless Communications Devices

Figure 9:
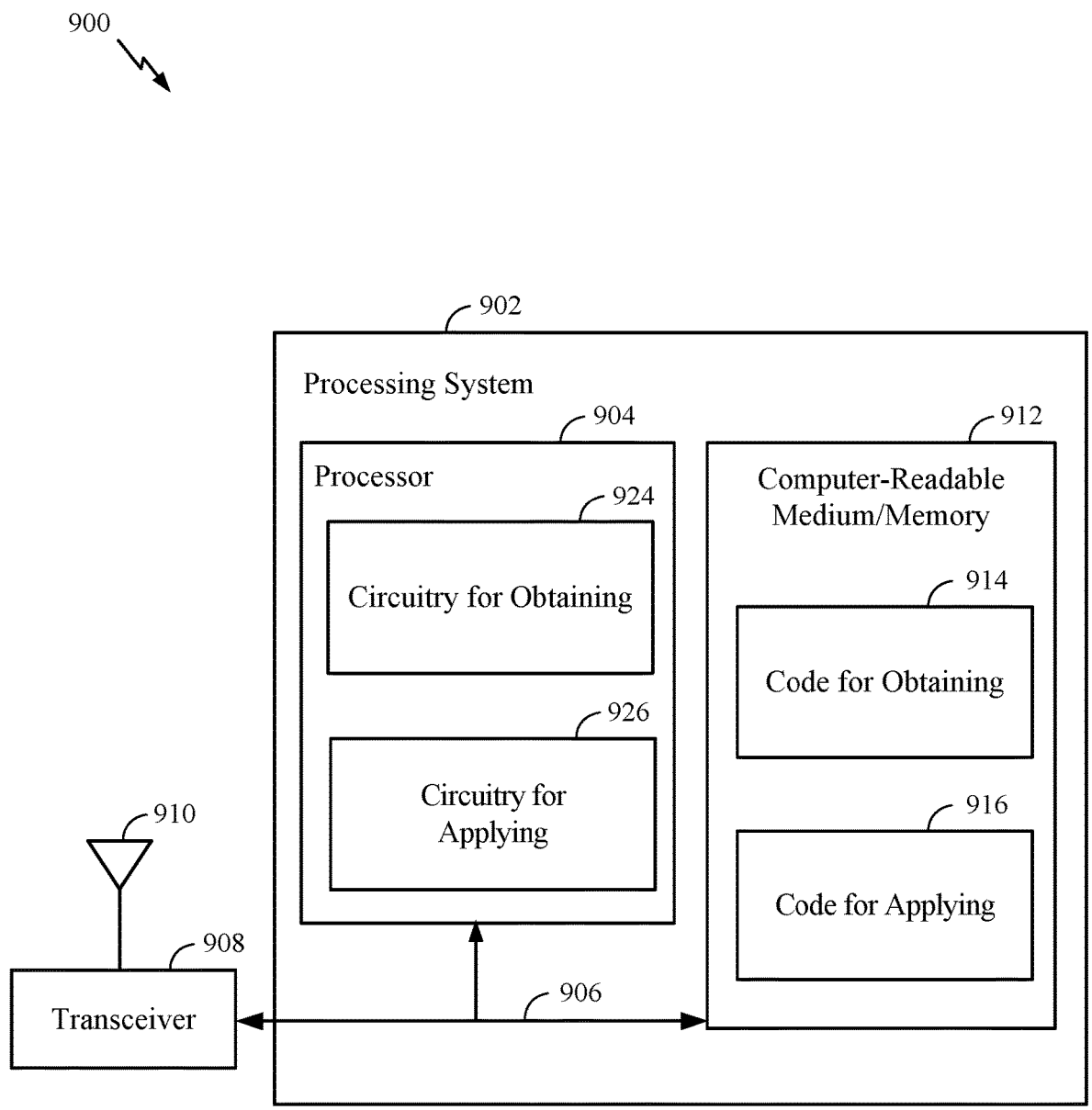
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) operable, configured, or adapted to perform operations for the techniques disclosed herein, such as the operations illustrated in FIG. 6. In some examples, communications device 1200 may be a receiver (RX) user equipment (UE), such as UE 120a or 120t described with respect to FIGS. 1 and 2.

Communications device 900 includes a processing system 902 coupled to a transceiver 908. Transceiver 908 is configured to transmit and receive signals for communications device 900 via an antenna 910, such as the various signals as described herein. Processing system 902 may be configured to perform processing functions for communications device 900, including processing signals received and/or to be transmitted by the communications device 900.

Processing system 902 includes a processor 904 coupled to a computer-readable medium/memory 912 via a bus 906. In certain aspects, computer-readable medium/memory 912 is configured to store instructions (e.g., computer-executable code) that when executed by processor 904, cause processor 904 to perform the operations illustrated in FIG. 6, or other operations for performing the various techniques discussed herein.

In certain aspects, computer-readable medium/memory 912 stores code 914 (an example means for) for obtaining (e.g., for obtaining, from a network entity, an indication of a timing advance (TA) for sidelink (SL) communications with a first transmitter (TX) UE) and code 916 (an example means for) for applying (e.g., for applying the indicated TA when receiving at least one SL transmission from the first TX UE).

In certain aspects, processor 904 has circuitry configured to implement the code stored in computer-readable medium/memory 912. Processor 904 includes circuitry 924 (an example means for) for obtaining (e.g., for obtaining, from a network entity, an indication of a TA for SL communications with a first transmitter TX UE) and circuitry 926 (an example means for) for applying (e.g., for applying the indicated TA when receiving at least one SL transmission from the first TX UE).

In some cases, the operations illustrated in FIG. 6, as well as other operations described herein, may be implemented by one or more means-plus-function components. For example, in some cases, such operations may be implemented by means for obtaining and means for applying.

In some cases, means for applying includes a processing system, which may include one or more processors, such as receive processor 258, transmit processor 264, TX MIMO processor 266, and/or controller/processor 280 of UE 120a illustrated in FIG. 2 and/or processing system 902 of communications device 900 in FIG. 9.

Means for obtaining or means for receiving may include a receiver (such as receive processor 258) or antenna(s) 252 of UE 120a illustrated in FIG. 2. Further, transceiver 908 may provide a means for receiving information. Information may be passed on to other components of communications device 900.

Notably, FIG. 9 is just one example, and many other examples and configurations of communications device 1200 are possible.

Figure 10:
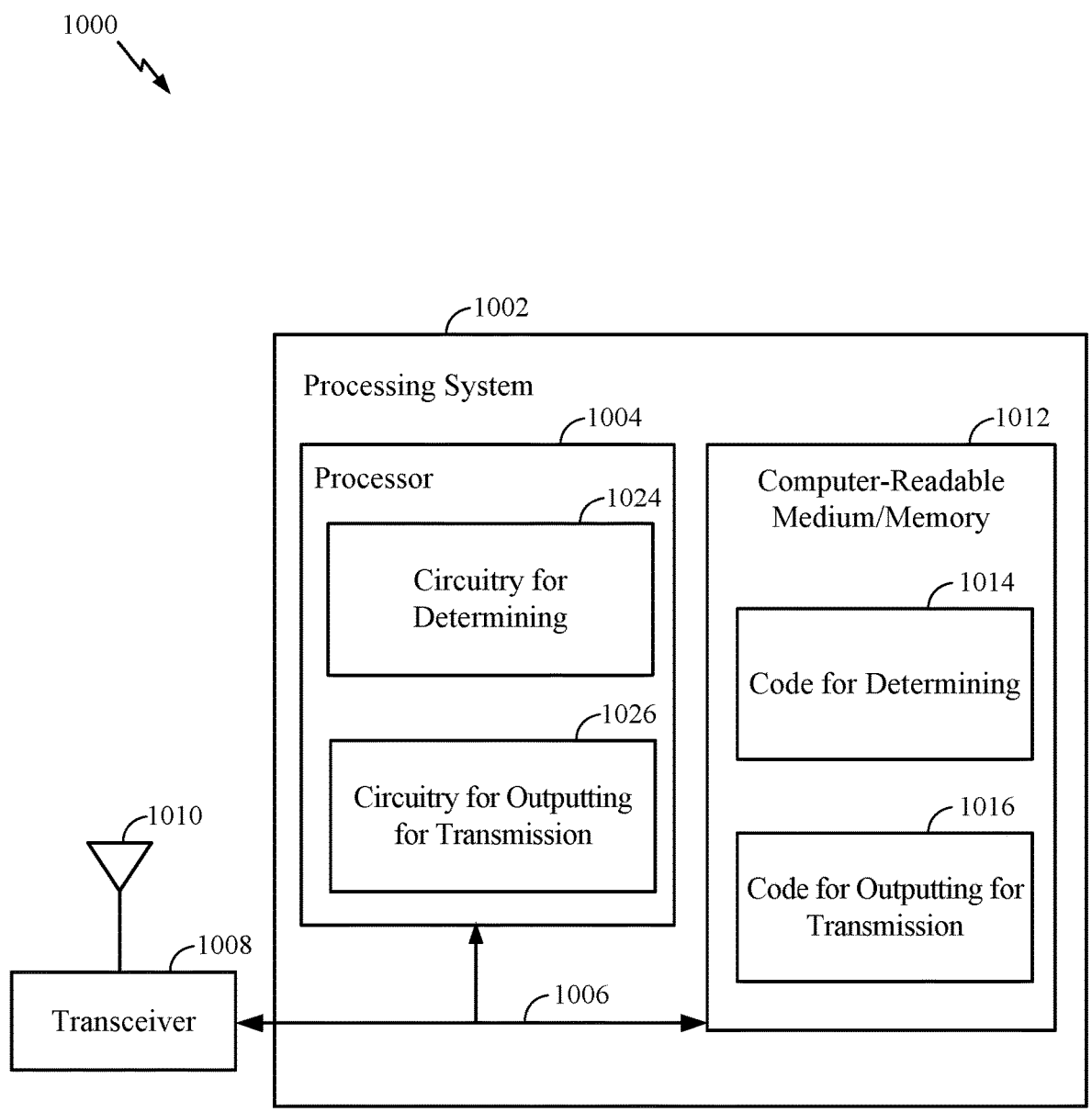
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) operable, configured, or adapted to perform operations for the techniques disclosed herein, such as the operations illustrated in FIG. 7. In some examples, communications device 1000 may be a network entity, such as a base station (BS) (e.g., BS 110a described with respect to FIGS. 1 and 2).

Communications device 1000 includes a processing system 1002 coupled to a transceiver 1008. Transceiver 1008 is configured to transmit and receive signals for communications device 1000 via an antenna 1010, such as the various signals as described herein. Processing system 1002 may be configured to perform processing functions for communications device 1000, including processing signals received and/or to be transmitted by communications device 1000.

Processing system 1002 includes a processor 1004 coupled to a computer-readable medium/memory 1012 via a bus 1006. In certain aspects, computer-readable medium/memory 1012 is configured to store instructions (e.g., computer-executable code) that when executed by processor 1004, cause processor 1004 to perform the operations illustrated in FIG. 7, or other operations for performing the various techniques discussed herein.

In certain aspects, computer-readable medium/memory 1012 stores code 1014 (an example means for) for determining (e.g., for determining a first TA for a RX UE to be used for SL communications between the RX UE and at least a first TX UE) and code 1016 (an example means for) for outputting (e.g., for outputting, for transmission to the RX UE, an indication of the first TA).

In certain aspects, processor 1004 has circuitry configured to implement the code stored in computer-readable medium/memory 1012. Processor 1004 includes circuitry 1024 (an example means for) for determining (e.g., for determining a first TA for a RX UE to be used for SL communications between the RX UE and at least a first TX UE) and circuitry 1026 (an example means for) for outputting for transmission (e.g., for outputting, for transmission to the RX UE, an indication of the first TA).

In some cases, the operations illustrated in FIG. 7, as well as other operations described herein, may be implemented by one or more means-plus-function components. For example, in some cases, such operations may be implemented by means for determining and means for outputting for transmission.

In some cases, means for determining includes a processing system, which may include one or more processors, such as receive processor 238, transmit processor 220, TX MIMO processor 230, and/or controller/processor 240 of BS 110a illustrated in FIG. 2 and/or processing system 1002 of communications device 1000 in FIG. 10.

Means for transmitting or means for outputting for transmission may include a transmitter (such as transmit processor 220) or antenna(s) 234 of BS 110a illustrated in FIG. 2. Further, transceiver 1008 may provide a means for transmitting information. Antenna 1010 may correspond to a single antenna or a set of antennas. Transceiver 1008 may provide means for transmitting signals generated by other components of communications device 1000.

Notably, FIG. 10 is just use one example, and many other examples and configurations of communications device 1000 are possible.

TA manager 112 and TA manager 122 may support wireless communication in accordance with examples as disclosed herein.

TA manager 112 and TA manager 122 may be an example of means for performing various aspects described herein. TA manager 112 and TA manager 122, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, TA manager 112 and TA manager 122, or its sub-components, may be implemented in code (e.g., as configuration management software or firmware) executed by a processor, or any combination thereof. If implemented in code executed by a processor, the functions of TA manager 112 and TA manager 122, or its sub-components may be executed by a general-purpose processor, a DSP, an ASIC, a FPGA or other programmable logic device.

In some examples, TA manager 112 and TA manager 122 may be configured to perform various operations (e.g., receiving, determining, transmitting/sending) using or otherwise in cooperation with the transceiver 908 or 1008.

TA manager 112 and TA manager 122, or its sub-components, may be physically located at various positions, including being distributed such that portions of functions are implemented at different physical locations by one or more physical components. In some examples, TA manager 112 and TA manager 122, or its sub-components, may be a separate and distinct component in accordance with various aspects of the present disclosure. In some examples, TA manager 112 and TA manager 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Implementation examples are described in the following numbered aspects:

Aspect 1: A method for wireless communications by a receiver (RX) user equipment (UE), comprising: receiving, from a network entity, an indication of a timing advance (TA) for sidelink (SL) communications with a first transmitter (TX) UE; and applying the indicated TA when receiving at least one SL transmission from the first TX UE.

Aspect 2: The method of Aspect 1, wherein the indication is received via a radio resource control (RRC) signaling.

Aspect 3: The method of any of Aspects 1-2, wherein the indication is received via a downlink control information (DCI).

Aspect 4: The method of Aspect 3, wherein the DCI schedules the at least one sidelink transmission from the first TX UE.

Aspect 5: The method of Aspect 3 or Aspect 4, wherein the DCI is intended for both the first TX UE and the RX UE.

Aspect 6: The method of Aspect 3, wherein the DCI is specific to the RX UE.

Aspect 7: The method of Aspect 3, wherein the DCI comprises a specific DCI for providing the indication of the TA.

Aspect 8: The method of any of Aspects 1-7, wherein the RX UE applies the indicated TA when receiving the SL transmission from the first TX UE until receiving another indication of an updated TA from the network entity.

Aspect 9: The method of any of Aspects 1-8, wherein the indicated TA is indicated as a change relative to a current TA value.

Aspect 10: The method of any of Aspects 1-9, wherein the indicated TA is specific for sidelink communications between the RX UE and the first TX UE.

Aspect 11: The method of Aspect 10, further comprising receiving another indication of another TA for sidelink communications between the RX UE and at least a second TX UE.

Aspect 12: The method of any of Aspects 1-11, wherein the indicated TA comprises a common TA to be applied for sidelink communications between the RX UE and multiple TX UEs.

Aspect 13: The method of any of Aspects 1-13, wherein the indicated TA is common to a plurality of UEs in a serving cell, including the TX UE and the RX UE.

Aspect 14: The method of Aspect 13, wherein the indication is received via a broadcast signaling.

Aspect 15: A method for wireless communications by a network entity, comprising: determining a first timing advance (TA) for a receiver (RX) user equipment (UE) to be used for sidelink (SL) communications between the RX UE and at least a first transmitter (TX) UE; and transmitting, to the RX UE, an indication of the first TA.

Aspect 16: The method of Aspect 15, wherein the indication is transmitted via radio resource control (RRC) signaling.

Aspect 17: The method of any of Aspects 15-16, wherein the indication is transmitted via a downlink control information (DCI).

Aspect 18: The method of Aspect 17, wherein the DCI schedules the at least one sidelink transmission from the first TX UE.

Aspect 19: The method of Aspect 17 or Aspect 18, wherein the DCI is intended for both the first TX UE and the RX UE.

Aspect 20: The method of any of Aspects 15-19, wherein the first TA is determined based on at least one of: an uplink (UL) TA of the first TX UE; or an UL TA of the RX UE.

Aspect 21: The method of Aspect 20, wherein the first TA is determined based on a mean value of the UL TA of the first TX UE and the UL TA of the RX UE.

Aspect 22: The method of Aspect 20, wherein the first TA is determined based on at least one of: a quantized UL TA of the first TX UE; a quantized UL TA of the RX UE; the UL TA of the first TX UE with an offset; or the UL TA of the RX UE with an offset.

Aspect 23: The method of Aspect 17, wherein the DCI is specific to the RX UE.

Aspect 24: The method of Aspect 17, wherein the DCI comprises a specific DCI for providing the indication of the first TA.

Aspect 25: The method of any of Aspects 15-24, further comprising: determining whether there is a change in value of the first TA; and transmitting the indication of the first TA when the value of the first TA has changed.

Aspect 26: The method of any of Aspects 15-25, wherein the first TA is indicated as a change relative to a current TA value.

Aspect 27: The method of any of Aspects 15-26, wherein the first TA is specific for sidelink communications between the RX UE and the first TX UE.

Aspect 28: The method of Aspect 27, further comprising transmitting, to the RX UE, an indication of a second TA for sidelink communications between the RX UE and at least a second TX UE.

Aspect 29: The method of any of Aspects 15-28, wherein the first TA comprises a common TA to be applied for sidelink communications between the RX UE and multiple TX UEs.

Aspect 30: The method of any of Aspects 15-29, further comprising determining a second TA for the first TX UE to use when sending sidelink transmission to the RX UE.

Aspect 31: The method of any of Aspects 15-30, further comprising configuring the RX UE with different TAs to apply for sidelink communications with different TX UEs.

Aspect 32: The method of Aspect 31, wherein the configuration is provided via a radio resource control (RRC) signaling.

Aspect 33: The method of any of Aspects 15-32, wherein the first TA is determined based, at least in part, on a location of at least one of the RX UE or the TX UE.

Aspect 34: The method of Aspect 33, further comprising at least one of: receiving, from the TX UE, a first report of the location of the TX UE; or receiving, from the RX UE, a second report of the location of the RX UE.

Aspect 35: The method of Aspect 34, wherein at least one of the first report or second report indicates: an absolute location; or a zone location.

Aspect 36: The method of any of Aspects 15-35, wherein the first TA is common to a plurality of UEs in a serving cell, including the first TX UE and the RX UE.

Aspect 37: The method of Aspect 36, wherein the indication is transmitted via a broadcast signaling.

Aspect 38. The method of Aspect 36, wherein the first TA is based, at least in part, on a cell radius of the serving cell.

Aspect 39: The method of Aspect 38, further comprising selecting: a first value for the first TA if the cell radius is less than a threshold radius; or a second value for the first TA if the cell radius is equal to or greater than the threshold radius.

Aspect 40: An apparatus, comprising: a memory; and one or more processors coupled to the memory, the memory and the one or more processors being configured to perform a method in accordance with any one of Aspects 1-39.

Aspect 41: An apparatus, comprising means for performing a method in accordance with any one of Aspects 1-39.

Aspect 42: A non-transitory computer-readable medium comprising executable instructions that, when executed by one or more processors of an apparatus, cause the apparatus to perform a method in accordance with any one of Aspects 1-39.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120a and/or processors 220, 230, 238, and/or controller/processor 240 of the BS 110a shown in FIG. 2 may be configured to perform operations 600 of FIG. 6 and/or operations 700 of FIG. 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for applying, means for determining, and means for configuring may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 13 and/or 14 may be performed by various processors shown in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 13 and/or 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a receiver (RX) user equipment (UE), comprising:
receiving, from a network entity, a first indication of a timing advance (TA) for sidelink (SL) communications with a first transmitter (TX) UE, wherein the first indication is received via a downlink control information (DCI), and wherein the DCI is intended for both the first TX UE and the RX UE; and applying the indicated TA when receiving at least one SL transmission from the first TX UE until receiving a second indication of an updated TA from the network entity.

2. The method of claim 1, wherein the DCI schedules the at least one SL transmission from the first TX UE.

3. The method of claim 1, wherein the DCI is specific to the RX UE.

4. The method of claim 1, wherein the DCI comprises a specific DCI for providing the first indication of the TA.

5. The method of claim 1, wherein the TA is indicated as a change relative to a current TA value.

6. The method of claim 1, wherein the indicated TA is specific for the SL communications between the RX UE and the first TX UE.

7. The method of claim 6, further comprising receiving a third indication of another TA for SL communications between the RX UE and at least a second TX UE.

8. The method of claim 1, wherein the indicated TA comprises a common TA to be applied for SL communications between the RX UE and multiple TX UEs.

9. The method of claim 1, wherein the indicated TA is common to a plurality of UEs in a serving cell, including the TX UE and the RX UE.

10. A method for wireless communications by a network entity, comprising:
    determining a first timing advance (TA) for a receiver (RX) user equipment (UE) to be used for sidelink (SL) communications between the RX UE and at least a first transmitter (TX) UE;
    transmitting, to the RX UE, an indication of the first TA, wherein the indication is transmitted via a downlink control information (DCI), wherein the DCI is intended for both the first TX UE and the RX UE, and wherein the indicated first TA is specific for the SL communications between the RX UE and the first TX UE; and
    transmitting another indication of another TA for SL communications between the RX UE and at least a second TX UE.

11. The method of claim 10, wherein the DCI schedules at least one SL transmission from the first TX UE.

12. The method of claim 10, wherein the first TA is determined based on at least one of:
    an uplink (UL) TA of the first TX UE; or
    an UL TA of the RX UE.

13. The method of claim 12, wherein the first TA is determined based on a mean value of the UL TA of the first TX UE and the UL TA of the RX UE.

14. The method of claim 10, wherein the DCI is specific to the RX UE.

15. The method of claim 10, further comprising:
    determining whether there is a change in value of the first TA; and
    transmitting the indication of the first TA when the value of the first TA has changed.

16. The method of claim 10, wherein the first TA is indicated as a change relative to a current TA value.

17. The method of claim 10, wherein the first TA is specific for SL communications between the RX UE and the first TX UE.

18. The method of claim 10, wherein the first TA comprises a common TA to be applied for SL communications between the RX UE and multiple TX UEs.

19. The method of claim 10, further comprising determining a second TA for the first TX UE to use when transmitting an SL transmission to the RX UE.

20. The method of claim 10, further comprising configuring the RX UE with different TAs to apply for SL communications with different TX UEs.

21. The method of claim 10, wherein the first TA is determined based, at least in part, on a location of at least one of the RX UE or the TX UE.

22. The method of claim 10, wherein the first TA is common to a plurality of UEs in a serving cell, including the first TX UE and the RX UE.

23. The method of claim 22, wherein the first TA is based, at least in part, on a cell radius of the serving cell.

24. An apparatus for wireless communication by a receiver (RX) user equipment (UE), comprising:
    memory; and
    one or more processors coupled to the memory, the one or more processors being configured, individually or collectively, to:
        receive, from a network entity, an indication of a timing advance (TA) for sidelink (SL) communications with a first transmitter (TX) UE, wherein the indication is received via a downlink control information (DCI), and wherein the DCI is intended for both the first TX UE and the RX UE; and
        apply the indicated TA when receiving at least one SL transmission from the first TX UE until another indication of an updated TA is received from the network entity.

25. An apparatus for wireless communication by a network entity, comprising:
    memory; and
    one or more processors coupled to the memory, the one or more processors being configured, individually or collectively, to:
        determine a first timing advance (TA) for a receiver (RX) user equipment (UE) to be used for sidelink (SL) communications between the RX UE and at least a first transmitter (TX) UE;
        transmit, to the RX UE, an indication of the first TA, wherein the indication is transmitted via a downlink control information (DCI), wherein the DCI is intended for both the first TX UE and the RX UE, and wherein the indicated first TA is specific for the SL communications between the RX UE and the first TX UE; and
        transmit another indication of another TA for SL communications between the RX UE and at least a second TX UE.

26. The apparatus of claim 24, wherein the DCI comprises a specific DCI for providing the indication of the TA.

27. The apparatus of claim 24, wherein the TA is indicated as a change relative to a current TA value.

28. The apparatus of claim 25, wherein the first TA is indicated as a change relative to a current TA value.

29. A method for wireless communications by a receiver (RX) user equipment (UE), comprising:
    receiving, from a network entity, an indication of a timing advance (TA) for sidelink (SL) communications with a first transmitter (TX) UE, wherein the indication is received via a downlink control information (DCI), wherein the DCI is intended for both the first TX UE and the RX UE, and wherein the indicated TA is specific for the SL communications between the RX UE and the first TX UE;
    applying the indicated TA when receiving at least one SL transmission from the first TX UE; and receiving another indication of another TA for SL communications between the RX UE and at least a second TX UE.

30. An apparatus for wireless communication by a receiver (RX) user equipment (UE), comprising:
memory; and
one or more processors coupled to the memory, the one or more processors being configured, individually or collectively, to:
receive, from a network entity, an indication of a timing advance (TA) for sidelink (SL) communications with a first transmitter (TX) UE, wherein the indication is received via a downlink control information (DCI), wherein the DCI is intended for both the first TX UE and the RX UE, and wherein the indicated TA is specific for the SL communications between the RX UE and the first TX UE;
apply the indicated TA when receiving at least one SL transmission from the first TX UE; and
receiving another indication of another TA for SL communications between the RX UE and at least a second TX UE.

* * * * *